United States Patent
Lauer

(10) Patent No.: US 6,186,488 B1
(45) Date of Patent: Feb. 13, 2001

(54) ARRANGEMENT FOR BLOCKING A SPRING IN A SPRING STRUT

(75) Inventor: Juergen Lauer, Stuttgart (DE)

(73) Assignee: Dr. Ing. h.c.F. Porsche AG, Weissach (DE)

( * ) Notice: Under 35 U.S.C. 154(b), the term of this patent shall be extended for 0 days.

(21) Appl. No.: 09/192,214

(22) Filed: Nov. 16, 1998

(30) Foreign Application Priority Data

Nov. 19, 1997 (DE) .............................. 197 51 215

(51) Int. Cl.⁷ .................................................. B60G 11/14
(52) U.S. Cl. .................. 267/287; 267/169; 267/178; 280/124.154; 280/754
(58) Field of Search ............................ 267/33, 287, 286, 267/166, 178, 179, 169; 280/754, 124.145, 124.154

(56) References Cited

U.S. PATENT DOCUMENTS

| 3,198,508 | * | 8/1965 | Melton et al. | 267/287 |
| 3,591,161 | * | 7/1971 | Scheublein, Jr. et al. | 267/287 |
| 3,674,250 | * | 7/1972 | Joseph | 267/287 |
| 3,773,309 | * | 11/1973 | Carter | 267/287 |
| 4,098,498 | * | 7/1978 | Da Silva | 267/287 |

FOREIGN PATENT DOCUMENTS 28 22 105   11/1979 (DE) .

* cited by examiner

Primary Examiner—Robert J. Oberleitner
Assistant Examiner—Mariano Sy
(74) Attorney, Agent, or Firm—Evenson, McKeown, Edwards & Lenahan, P.L.L.C.

(57) ABSTRACT

An arrangement is provided for blocking a spring in a spring strut of a motor vehicle. A spacer element for transporting a vehicle consists of at least one segment which can be snapped into the spring and is supported by a lower free end on a stationary spring plate of the spring strut.

21 Claims, 1 Drawing Sheet

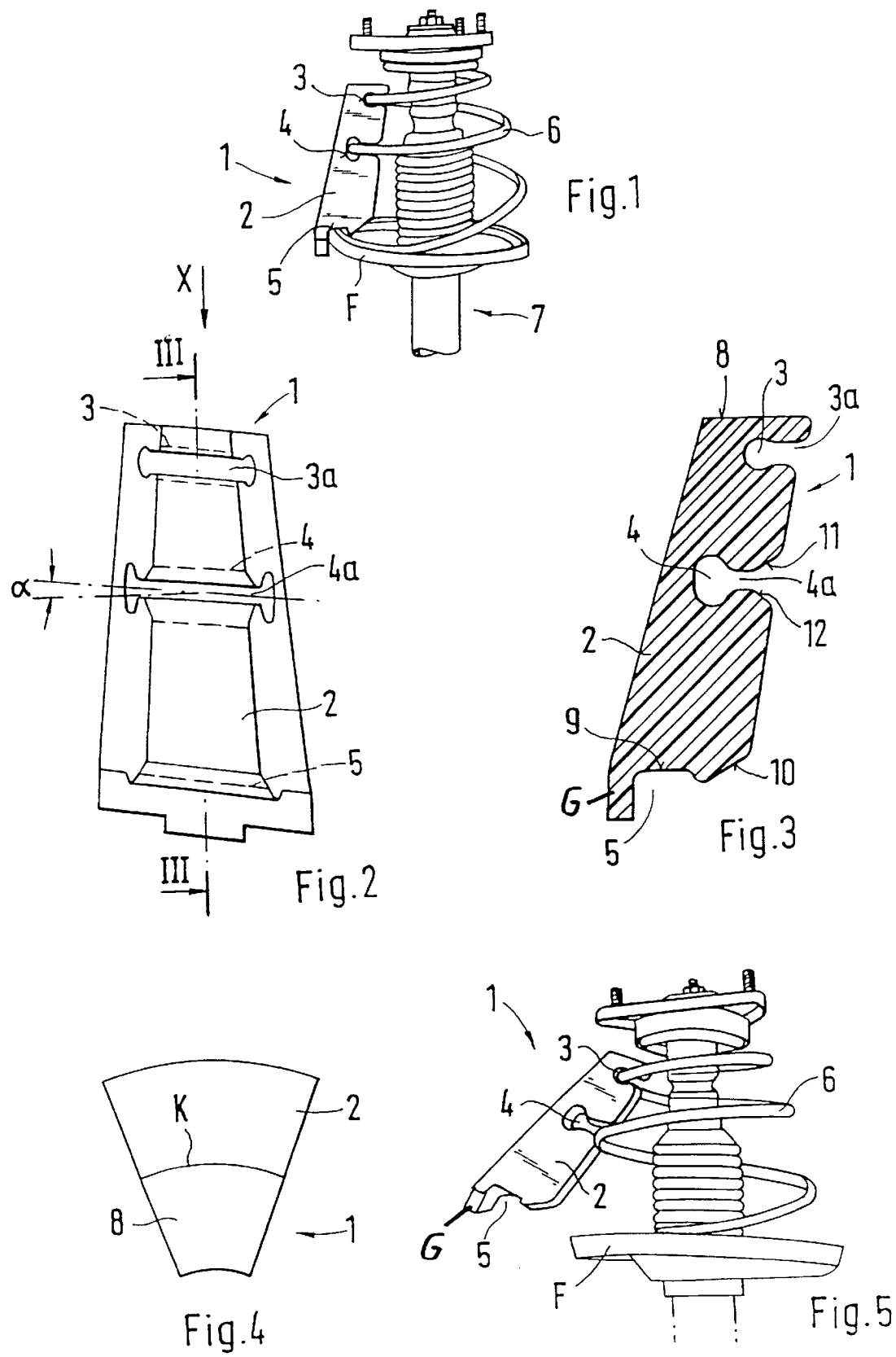

ARRANGEMENT FOR BLOCKING A SPRING IN A SPRING STRUT

BACKGROUND OF THE INVENTION

This application claims the priority of German application No. 197 51 215.1, filed Nov. 19, 1997, the disclosure of which is expressly incorporated by reference herein.

The present invention relates to an arrangement for blocking a spring in a vehicle spring strut, and more particularly, to a spacer element for transporting the vehicle.

DE 28 22 105 A1 discloses a method influencing the spring travel of a coil spring of a spring strut for a motor vehicle by way of spacers. These are held on a plate by screws and are in each case clamped between coils of the spring.

SUMMARY OF THE INVENTION

An object of the present invention is to provide an arrangement for a spring on a spring strut of a motor vehicle which, by way of a simple handling, permits a complete blocking of the spring for the purpose of transport.

According to the invention, this object has been achieved by providing the spacer element consists of at least one segment which can be snapped into the spring and is supported by means of a lower free end on a stationary spring plate of the spring strut.

Principal advantages achieved by the invention includes the spacer consisting of a segment made of a hard-elastic plastic material which can be rapidly snapped into the spring and can easily be removed again.

The snapping into the coils of the spring takes place in one or several bearing receiving devices of the spacer element such that an upper receiving device is used as a threading receiving device and the spacer element is swivelled about this bearing onto the stationary spring plate of the spring strut and is supported here. The support preferably takes place in a receiving groove of the spacer element. A receiving device in the spacer element for bearing the spring coil is constructed in the vertical direction in the shape of an oblong hole for compensating tolerances, whereas the threading receiving device has a circular cross-section.

So that the snapping-in and snapping-out with respect to the spring can be carried out in an unimpaired and rapid manner, corresponding insertion slopes are provided for receiving the spring coils.

Furthermore, for receiving the coils in the receiving devices, inserting ducts are provided which have a lower height than the receiving devices themselves so that, after taking up a locked position, the spring coils will remain caught in the receiving devices.

For the precise adaptation of the spacer elements to the spring construction, the receiving devices have a correspondingly adapted curved and tilted course or shape.

BRIEF DESCRIPTION OF THE DRAWINGS

These and further objects, features and advantages of the present invention will become more apparent from the following detailed description of a currently preferred embodiments when taken in conjunction with the accompanying drawings wherein:

FIG. 1 is a perspective view of a spring snapped into a spacer element in accordance with the present invention;

FIG. 2 is a front elevational view of the spacer element shown in FIG. 1;

FIG. 3 is a cross-sectional view of the spa element along line III—III of FIG. 2;

FIG. 4 is a view of the spacer element in the direction of the arrow X in FIG. 2; and FIG. 5 is a perspective view showing the spacer element being snapped in.

DETAILED DESCRIPTION OF THE DRAWINGS

The spacer element designated generally by numeral 1 preferably consists of a segment 2 with bearing receiving devices 3, 4 as well as a supporting groove 5 and is preferably formed of a hard-elastic plastic material. The segment 2 can be snapped into a spring 6 of a spring strut 7 and is supported by its lower end 9 on a stationary spring plate F.

The segment 2 consists at least of one oblong and relatively narrow part and, close to an upper free end 8, has the threading receiving device 3 which can be snapped into a first spring coil.

The additional receiving device 4 is situated underneath, approximately in the center of the segment 2 and receives the second spring coil. At the lower free end 9, the receiving groove 5 is provided in the segment 2 and is supported on the edge of the spring plate F. In the illustrated embodiment, only two receiving devices 3 and 4 are provided. In the case of a longer spring, however, correspondingly more receiving devices are conceivable.

As illustrated in detail in FIG. 5, the segment 2 is first snapped by way of the threading receiving devices 3 into the spring 6. Then, as illustrated in more detail in FIG. 1, the segment 2 is swivelled against the spring 6 and, by way of the additional receiving device 4, is clamped into the spring 6 so that the receiving groove 5 can take up a supporting position on the spring plate F.

The threading receiving device 3 has a bearing with a round cross-section which is provided with an insertion duct 3a. This duct 3a has a lower height than the receiving device 3.

The additional receiving device 4 has an oblong-hole-shaped construction in the vertical direction and has an inserting duct 4a which also has a lower height than the oblong hole. The inserting ducts 3a and 4a have such a narrow construction that the spring coils caught in the receiving devices 3, 4 cannot slide out again. The receiving device 4 is provided with the oblong hole shape in order to be able to compensate tolerances between the spring coils.

At the lower end 9 of the segment 2, the receiving groove 5 is provided with a mounting slope 10. The receiving groove 4 is correspondingly provided with mounting slopes 11 and 12 at the inserting duct 4a of the receiving device 4. A grip part G is provided which projects from the wall of the groove 5, which ensures a good handling and simplifies a snapping-in and pulling-out. In addition, the snapped-in position is fixed.

The receiving devices 3, 4 as well as the receiving groove 5 have a course or shelf which is adapted to the spring coil, as illustrated particularly in FIG. 2 in conjunction with FIG. 4. As shown in FIG. 2, the receiving devices 3, 4 extend at an angle α and, as illustrated in FIG. 4, on a circular-arc section K.

The foregoing disclosure has been set forth merely to illustrate the invention and is not intended to be limiting. Since modifications of the disclosed embodiment incorporating the spirit and substance of the invention may occur to persons skilled in the art, the invention should be construed to include everything within the scope of the appended claims and equivalents thereof.

What is claimed is:

1. Arrangement for blocking a spring in a spring strut of a motor vehicle, comprising a spacer element for transportation of the vehicle wherein the spacer element includes at least one segment configured to be snapped into the spring and has a lower free end thereof contacting a stationary spring plate of the spring strut.

2. Arrangement according to claim 1, wherein the spacer element includes bearing receiving devices situated one above another for coils of the spring and, at the lower free end, has a receiving groove directed to an edge of the spring plate.

3. Arrangement according to claim 2, wherein one of the bearing receiving devices arranged proximate an upper free end of the spacer element is configured as a threading receiving device with a bearing having a round cross-section for a first spring coil.

4. Arrangement according to claim 2, wherein one of the bearing receiving devices has opposite mounting slopes with a bearing for a second spring coil of the spring, which bearing has an oblong-hole-shaped construction in the vertical direction.

5. Arrangement according to claim 4, wherein the receiving device arranged on an upper free end of the spacer element is configured as a threading receiving device with a bearing having a round cross-section for a first spring coil.

6. Arrangement according to claim 3, wherein, on the lower free end, the receiving groove has a mounting slope opening toward the upper free end.

7. Arrangement according to claim 6, wherein another one of the bearing receiving devices has opposite mounting slopes with a bearing for a second spring coil of the spring, which bearing has an oblong-hole-shaped construction in the vertical direction.

8. Arrangement according to claim 1, wherein the spacer element consists of an elastic material.

9. Arrangement according to claim 2, wherein each of the bearing receiving devices have an insertion duct having a lower height than the bearing receiving devices.

10. Arrangement according to claim 9, wherein the receiving device arranged on an upper free end of the spacer element is configured as a threading receiving device with a bearing having a round cross-section for a first spring coil.

11. Arrangement according to claim 10, wherein another one of the bearing receiving devices has opposite mounting slopes with a bearing for a second spring coil of the spring, which bearing has an oblong-hole-shaped construction in the vertical direction.

12. Arrangement for blocking a spring in a spring strut of a motor vehicle, comprising a spacer element for transportation of the vehicle, wherein the spacer element includes at least one segment configured to be snapped into the spring and supported by a lower free end thereof on a stationary spring plate of the spring strut, wherein the spacer element includes bearing receiving devices situated one above another for coils of the spring and, at the lower free end, has a receiving groove directed to an edge of the spring plate, and the receiving groove and the bearing receiving devices form part of a circular arc, are adapted to the shape of the spring coils and are arranged at a corresponding angle.

13. Arrangement according to claim 12, wherein the receiving device arranged on an upper free end of the spacer element is configured as a threading receiving device with a bearing having a round cross-section for a first spring coil.

14. Arrangement according to claim 13, wherein another one of the bearing receiving devices has opposite mounting slopes with a bearing for a second spring coil of the spring, which bearing has an oblong-hole-shaped construction in the vertical direction.

15. Arrangement according to claim 13, wherein, on the lower free end, the receiving groove has a mounting slope opening toward the upper free end.

16. Arrangement according to claim 12 wherein the spacer element consists of an elastic material.

17. Arrangement, comprising a motor vehicle spring strut having a spring and stationary spring plate, and a spacer element having at least one segment configured to be snapped onto a coil of the spring and has a lower free end contacting the stationary spring plate.

18. Arrangement according to claim 17, wherein the spacer element includes bearing receiving devices situated one above another for coils of the spring and, at the lower free end, has a receiving groove directed to an edge of the spring plate.

19. Arrangement according to claim 17, wherein one of the bearing receiving devices arranged proximate an upper free end of the spacer element is configured as a threading receiving device with a bearing having a round cross-section for a first spring coil.

20. Arrangement according to claim 19, wherein the spacer element includes bearing receiving devices situated one above another for coils of the spring and, at the lower free end, has a receiving groove directed to an edge of the spring plate.

21. Method of blocking a spring in a spring strut of a motor vehicle for transporting the motor vehicle by other than the motor vehicle's own power, comprising snapping an at least one segment of a spacer element onto the spring, and swivelling the spacer element so that a lower free end thereof contacts a stationary plate of the spring strut.

* * * * *